March 20, 1951

C. E. PECK ET AL 2,546,013

MEANS AND METHOD FOR PRODUCING SPECIAL
HEAT-TREATING GASEOUS ATMOSPHERES
Filed June 19, 1942

WITNESSES:
Robert C. Baird
Nur. C. Groove

INVENTORS
Clarence E. Peck and
John G. Hoop.
BY
B. L. Zangwill
ATTORNEY

Patented Mar. 20, 1951

2,546,013

UNITED STATES PATENT OFFICE 2,546,013

MEANS AND METHOD FOR PRODUCING SPECIAL HEAT-TREATING GASEOUS ATMOSPHERES

Clarence E. Peck, Wilkinsburg, and John G. Hoop, Pittsburgh, Pa., assignors to Westinghouse Electric Corporation, East Pittsburgh, Pa., a corporation of Pennsylvania Application June 19, 1942, Serial No. 447,682

11 Claims. (Cl. 252—373)

Our invention relates broadly to gas-reacting systems for producing a special gaseous atmosphere such as is used for enveloping metal undergoing a heat-treating process; and, more particularly, relates to such systems, comprising a gas-reacting means, in which a suitable combustible fuel or a combustible gas is continuously reacted in the presence of heat with an oxygen-containing gas, comprising air, for continuously producing a product-gas utilizable as or for such a special atmosphere which comprises essentially a mixture of carbon monoxide, nitrogen and hydrogen, usually some methane and non-objectionable or negligible amounts of water vapor and carbon dioxide.

In the practicable production of a special atmosphere of the type described, the combustible fuel used is usually one of the more readily available combustible or hydrocarbon gases, and may be either a petroleum gas, a manufactured or illuminating gas, a natural gas, hydrocarbon gases or combinations thereof. The reactions of such fuel gas in different proportions at different temperatures with air for producing special heat-treating atmospheres, are more or less well known.

Our invention, although not limited thereto, is more particularly useful with fuel gas which is manufactured and sometimes also called city or illuminating gas. City gas generally comprises a hydrocarbon, hydrogen, carbon monoxide and carbon dioxide which is in significant amounts when considered in connection with a special atmosphere utilized for enveloping a material undergoing heat-treatment. The exact composition of city gas, however, varies in different localities and from time to time in the same locality. Such variations of fuel gas quality and composition, or changes in the temperature of either the gas or the air, and other variable factors make it difficult to produce a fairly uniform special atmosphere, unless the gas-generator in which the gas and air are reacted, is continuously adjusted. A relative increase in the proportion of air with respect to the fuel gas may cause an increase in carbon dioxide and water vapor content, which increase may be detrimental to a heat-treating process in which decarburization or oxidation is not desired. On the other hand, a relative increase in the fuel gas portion, for reducing either or both the carbon dioxide content and water vapor content to an unobjectionable amount, may cause an excess deposit of free carbon in solid form in the gas-generator, the carbon collecting and gradually accumulating until gas-flow through the gas-generator is interfered with to such an extent that the operation of the gas-generator must be interrupted while excess carbon is removed.

It is an object of our invention to provide a gas-generating generator system of a type described which is automatically controlled for consistently producing a practicable product-gas for a special atmosphere.

It is a further object of our invention to provide a gas-system for and method of reacting fuel gas and air, which are adaptable for use with fuel gases of different compositions.

It is an object of our invention to provide a method for controlling the flow of supply-gases, comprising fuel gas and air, to a gas-reacting means to the end that a continuous output of product-gas of suitable quality will be obtained from the gas-reacting means.

It is an additional object of our invention to provide a gas-generator system of the type described in which city gas and air can be reacted for producing a product-gas having substantially no carbon dioxide.

It is a more general object of our invention to provide a means and method in which and by which a fuel gas and air can be reacted in the presence of heat, to produce a product-gas or a special atmosphere having a low carbon dioxide content and a low dew point, even though the supplied gases may initially contain a relatively substantial proportion of either or both.

It is a further object of our invention to provide a gas-generator system which can be operated continuously for producing a special atmosphere of the type described, having carbon pressures which will be in a safe range for a desired heat-treatment process; by carbon pressure meaning a measure of that characteristic of a carbonaceous gas to give up carbon to, or abstract carbon from, a steel of given carbon content, as more particularly referred to, for example, in J. R. Gier, Jr. Patent. No. 2,279,231 of April 7, 1942, and his article, "Protective Atmospheres for Hardening Steel" in the January 1941, Industrial and Engineering Chemistry.

It is a further object of our invention to provide a system of the type described comprising a gas-reaction chamber in which fuel gas and air are continuously reacted in the presence of heat but in such manner that the gas-generator will not become clogged with deposited carbon to such an extent as to objectionably impede gas-flow through the gas-generator.

Briefly, according to our invention, the gas-generator system comprises a reaction-chamber or means in which the fuel gas and air are reacted under conditions conducive to free carbon deposit. When the deposit becomes large enough, the supply-mixture of fuel gas and air is changed, with or without a reversal in the direction of gas-flow through the reaction-chamber, to the end that carbon of the original carbon deposit is consumed to a desirable extent, after which the original flow conditions are reestablished until the carbon deposit is again such as to require a repetition of the carbon-consuming operation. Preferably, the gas-generating system incorporates a control means which will automatically control the gas-flow conditions through the reaction-chamber but in a manner to keep a carbon deposit in the reaction-chamber at all times after carbon has been initially put therein.

Many other objects, features, processes and innovations of our invention, in addition to the foregoing, will be apparent or discernible from the following description thereof which may be considered in connection with the accompanying drawing. In this drawing, which somewhat diagrammatically and schematically illustrates preferred forms of our invention, like numerals designate similar parts. In the drawing:

Figure 1 is a schematic representation of a gas-reacting system in accordance with our invention; and Fig. 2 is a modified form thereof.

Referring to the drawing, and more particularly to the embodiment shown in Fig. 1, a system is disclosed which comprises a gas-reaction means in the form of a gas-generator, indicated in its entirety by the reference numeral 1, in which the supply-gases are reacted. The gas-generator comprises a metal encased heat insulating and resistant refractory wall structure 2 in which is disposed a reaction-chamber means comprising a retort or reactor-chamber indicated in its entirety by the reference numeral 3. The reaction-chamber is heated for supplying energy to the reacting gases. In the forms of invention herein shown, the reaction-chamber 3 is spaced from the wall-structure 2 to provide a heating-space 4 in which heating means 5, in this instance electrical heating means, are supported by the wall-structure 2 for heating the reaction-chamber 3 to adjustable, controllable temperatures generally in the neighborhood of some temperature value in a range between about 2200° F. and about 1900° F. and lower. Generally, however, the lower temperatures are adequate. Any suitable temperature-control means can be used for controlling the heating of the reaction-chamber 3, and other arrangements used for heating the reaction-chamber.

The reaction-chamber 3 comprises an outer refractory, nickel-alloy hollow cylindrically-shaped vessel 6 having a closing vessel-wall 7 at one end and a closing vessel-wall 8 at its other end. A pipe 9 opens into the vessel 6 near the vessel-wall 7, and a pipe 10 opens into the vessel 6 near the vessel-wall 8. The pipes are gas-tightly secured to the vessel. The inside of the vessel 6 comprises a reaction-promoting means comprising, preferably a catalyst chamber 11 filled with a porous catalyst 12 which may be nickel shot, using the term "porous" to refer to any kind or condition of catalyst that will let gas through and that will clog or increase its resistance to gas-flow as a result of carbon-deposits.

In the operation of the gas-generator a supply-mixture of air and a carbonaceous fuel gas is continuously supplied, during a run, either through the pipe 9 or the pipe 10, and the product-gas is continuously discharged. When the pipe 9 is the supply-inlet, pipe 10 is the product-gas outlet and vice versa. In the specific manner disclosed herein of operating the gas-generator, the product-gas may be of a nature for use as, or for, a special atmosphere for enveloping alloy carbon steel charges undergoing heat-treatment for quench hardening; such heat-treatments generally involving relatively short heating periods in which the carbon pressure of the enveloping special atmosphere may be somewhat different, through a relatively large range, from that of the steel without effecting the carbon content of the steel, and can differ considerably when carbon diffusion in the steel is relatively slow. A special atmosphere comprising essentially carbon monoxide, hydrogen and nitrogen with very little, if any, carbon dioxide and of low dew point will be substantially neutral during such heat-treatments, leaning on the carburizing side. The temperatures at which the reaction-chamber 3 is operated and the proportions of air and fuel gas supplied will depend on the composition or quality of the supply-gases and the nature of the product-gas which is to be produced. The chemical reactions involved, however, are known to the art. With natural gas as the supplied fuel gas, the air to fuel gas ratio may be as high as about 2 to 1 and higher, while with manufactured city gas as the fuel gas the ratio may be as low as .6 to 1 and lower, for the product-gas of the type described.

In accordance with our invention, the gas-generator is particularly adapted to the reaction of air and manufactured city gas by operating the gas-reaction chamber with free carbon therein, this free carbon being initially added in any suitable manner, but preferably, by supplying the gas-generator with a gaseous supply-mixture having very high percentage of fuel gas so that the endothermal reaction thereof with air will cause a rapid separation of carbon from the gases, which deposits in the catalyst chamber 11, generally in the interstices formed by the nickel shot 12 which may comprise a multitude of small balls.

By operating the gas-generator with a relatively richer supply-mixture, that is one which will produce a satisfactory product-gas for a special atmosphere while having slightly less oxygen than is necessary to oxidize, to carbon-monoxide, the carbon-content of the mixture, thus causing free carbon to be deposited in the reaction chamber 3, the richness depending on the quality of the fuel gas, the carbon deposit tends to accumulate. Before the carbon-deposit has increased enough to impair the operation of the gas-generator, the supply-mixture may be made leaner so as to have slightly more oxygen than is necessary to oxidize, to carbon-monoxide, the carbon-content of the mixture, so that the reaction of the air and fuel gas is accompanied by an absorption or oxidation of free carbon which is converted into a product-gas constituent. A richer mixture is supplied after deposited carbon has been consumed to some extent, but preferably not to such an extent as to remove all of the free carbon. This richer mixture again causes a build-up of free carbon; and so by successively alternately reacting richer and leaner supply-mixtures in the gas-generator 1, a suitable product-gas can be continuously obtained for use as, or for, a special atmosphere. This described operation may be said to keep the carbon deposit in the gas-reaction chamber at an average value from which it alternately varies within certain desirable ranges. However, the maximum carbon deposit is not permitted to be so great as to seriously interfere with in the gas-flow through the gas-generator; while the minimum is not permitted to be so low as to adversely effect the product-gas. By trial and error, and gas analysis if necessary, satisfactory conditions, which need not be critical, may be obtained. While deposited carbon is being removed the product-gas will have slightly lower hydrogen content and slightly greater carbon monoxide content as compared to operations during which carbon is deposited. However, the carbon dioxide content and water vapor content can be maintained substantially unchanged, if the leaner mixture is supplied only for limited times, the period being a factor of the relative leanness of the supply-mixture.

The proportions of air and fuel gas of the supply mixture can be varied through control of either one or both, but we prefer to have the air supply controlled.

Operation of the gas-generator in accordance with the foregoing is especially advantageous when the fuel gas available is manufactured or city gas of a type including relatively large percentages of carbon dioxide. By keeping a carbon deposit in the gas-generator, the reduction of oxidizing gases is enhanced, and if any water vapor is present in objectionable quantities in the product-gas, it can be easily removed through the use of a condenser or dehydrator, although in general the product-gas obtained with our invention has a dew point sufficiently low to make it unnecessary to use such water separators. While, of course, carbon dioxide can also be removed outside the gas-generator, the expense of the required apparatus and process is eliminated by the use of our invention.

The gas-flow through the reaction-chamber 3 may be unidirectional, or may be periodically reversed. In the system of Fig. 1 the richer and leaner supply-mixture alternately flow in the same direction through the reaction-chamber 3; while in the system of Fig. 2 the richer supply-mixture flows through the reaction-chamber 3 in one direction and the leaner supply-mixture flows therethrough in the opposite direction.

The varying carbon deposit tends to vary the resistance to gas-flow through the reaction-chamber 3, varying the gas-pressure drop across it. When carbon is deposited through the use of a rich supply-mixture, gas-flow resistance increases; and when carbon is consumed through the use of a leaner mixture the resistance decreases. This effect on gas-flow is one which can be utilized for automatically controlling the relative richness of the supply-mixture to the end that a satisfactory carbon deposit is kept in the reaction-chamber 3. When such pressure control is utilized, it is desirable to have the supply-mixture supplied at a sufficiently high pressure to assure a substantially constant rate of flow of supply-mixture to the gas-generator irrespective of the resistance it may offer to gas-flow.

Two different manners of controlling the quality of the supply-mixture are illustrated by separate application arbitrarily applied to Figs. 1 and 2, respectively.

Referring to Fig. 1, air, which may be conditioned or cleaned, or both, is supplied under constant pressure through an air inlet-pipe 20, and fuel gas is supplied through a fuel gas inlet-pipe 21, both pipes feeding to any suitable gas-proportioning gas-mixing device 22 in which the air and fuel gas are mixed in any desired proportions. The proportioning device 22 discharges into a connecting pipe 23 leading to a constant pressure pumping equipment 24 comprising a constant volume pump 25 and a by-pass pressure-operated weight-controlled regulator 26 connected across the pump 25. The constant pressure equipment 24 delivers a gaseous supply-mixture under a substantially constant pressure which is amply above the maximum expected pressure-drop in the reaction-chamber 3. The supply-mixture leaving the equipment 24 is delivered to a constant flow equipment 27 comprising a manually adjustable valve 28 and an adjustable valve mechanism 29 controlled by a differential pressure regulator 30, the supply-mixture thereafter flowing through a pipe 31 and then through the pipe 9, acting as an inlet pipe for the gas-generator 1. The gas then passes through the heated catalyst 12, and out through the pipe 10 to a cooler 32 for cooling the gas, from which it emerges as a product-gas which can be fed to a hardening or other furnace (not shown) as a special atmosphere therefor. If desired the cooler 32 may comprise a mechanical water-remover, although a separate mechanical water-remover 33 can be used.

Suitable flow-control devices and flow-indicating devices may be placed in the system, indicators 34 being shown in the air and the fuel gas supply-pipes.

The proportioning device 22 is operated so as to discharge a relatively richer mixture of air and fuel gas, the actual proportions of each gas depending on the quality of the fuel gas and the desired product-gas, both of which may vary considerably. The discharged mixture, however, is rich enough to cause carbon to be deposited in the reaction-chamber 3. In order to obtain a leaner mixture, a by-pass connection 40 is connected between the air inlet-pipe 20 and the connecting pipe 23, this by-pass connection including a valve 41 controlled by an electric means 42, which may be a solenoid or other suitable means, which when energized causes opening of the by-pass connection to permit air-flow therethrough, and when deenergized causes air-flow to be barred therethrough, the rate of air-flow depending on the adjustment of the valve 41.

The solenoid 42 is in an energizable electric circuit 43 which includes a source of electrical power 44 and a normally open switch means comprising a pair of normally-open contacts 45 controlling the circuit. The contacts 45 are part of, and operated by, a pressure-responsive device 46, of any suitable form, connected so as to be responsive to the pressure of the gaseous supply-mixture at the inlet end of the gas-generator or at the outlet end of constant-flow equipment 27, the two places being substantially at the same pressure in the piping connections shown. The pressure-responsive device 46 is of a type which operates the contacts 45 to closed position when the pressure reaches and is above a preset value; the contacts, however, remaining closed when the pressure drops until another predetermined pressure value lower than the closing value is reached, whereupon the pressure-responsive device 46 operates the contacts 45 to open position. The contacts remain open until the preset closing pressure value is again reached.

By maintaining a constant flow-rate to the gas-generator, it is apparent that the inlet pressure to the gas-generator will depend on the extent to which the carbon deposit in the reaction-chamber restricts the flow of gas. In the operating-condition under which the rich gas-supply is delivered to the reaction-chamber 12, the inlet pressure will increase as the flow-path through the reaction-chamber 3 becomes restricted by the deposition of free carbon in the catalyst 12 and conversely the inlet pressure will decrease in the operating-condition under which the lean gas-supply is delivered to the reaction-chamber 12, and deposited carbon is consumed.

When enough carbon has been deposited to cause the contacts 45 to close, the solenoid 42 is actuated and opens the valve 41 to permit a measured rate of additional air to flow into the by-pass connection 40 for mixing with the proportions of air and fuel gas supplied by the proportioning device 22, thereby making the mixture fed to the constant pressure equipment 24 leaner. The new mixture should be sufficiently leaner to cause deposited carbon to be consumed so that the pressure acting on the pressure-responsive device 46 will be respondingly lowered. When the pressure has dropped through the proper range, the contacts 45 open, thereby de-energizing the solenoid 42 and causing the valve 41 to shut off such supply of additional air, and restoring the flow of supply-mixture of the original richness to the gas-generator 1. The cycle of alternate feeding of relatively richer and leaner supply-mixtures to the gas-generator 1 is thus continuously repeated.

Initially the gas-generator is primed or carbon deposited therein by utilizing a rich supply-mixture, the product-gas being completely vented through a vent 47, if desired. After a suitable carbon deposit has been formed, this vent may be shut off and the product-gas fed to the furnace. The initial adjustments of the various control means can be made manually until the quality of the product-gas under both richer and leaner conditions is satisfactory.

A system such as shown in Fig. 1 is especially adapted for use where the gas-generator discharges against a gas-pressure which is substantially constant.

The system of Fig. 2 differs from that of Fig. 1 primarily in that a gas-flow reversing system, comprising flow-reversing solenoid-operated valves 51, 52, 53 and 54, determines the direction in which gas will flow through the gas-generator, the valves 51 and 52 being closed when the valves 53 and 54 are open, and vice versa, and in that the switch means comprising the normally-open contacts 45 also controls these valves and is operated by a differential pressure-responsive device 50 which is responsive to the differential pressure between the main supply-pipe 31 and the inlet-pipe to the water remover 33'.

In the operation of the system of the system of Fig. 2, the contacts 45 close when the carbon deposit in the reaction-chamber 3 becomes sufficiently great to cause a high pressure drop in the gas flowing through the reaction-chamber. Closing of the contacts 45 makes the supply mixture leaner, as before, but also opens the valves 51 and 52, and closes the valves 53 and 54 so that this leaner mixture flows from the supply connecting pipe 31, the valve 51, the pipe 10, the reaction-chamber 3, the pipe 9, the cooler 32', the valve 52, and ultimately to the furnace. When the leaner mixture has consumed sufficient carbon to cause the differential pressure to drop and thereby cause the contacts 45 to open, valves 51 and 52 are closed and 53 and 54 opened, and the solenoid 42 deenergized, so that the supply-mixture is enriched and flows through the valve 53, the pipe 9, the reaction-chamber 3, the pipe 10, the cooler 32" and the valve 54. Accordingly, in the system of Fig. 2, the gas-flow through the reaction-chamber 3 is periodically reversed, responsive to the pressure drop across the reaction-chamber, a richer mixture flowing in one direction and a leaner mixture flowing in the other direction.

As an example of the operation of our system, a supply-mixture of air and Hartford, Connecticut, city gas was reacted in a relatively richer mixture having an air-to-gas ratio of .6 to 1. A utilizable product-gas of the following composition was obtained: carbon dioxide and oxygen substantially nil, carbon monoxide about 16.8%, hydrogen about 60.6%, methane about 2%, balance substantially nitrogen. This gas has a dew point of $-12°$ F. With a relatively leaner mixture of 1 to 1 the product-gas had a composition: carbon dioxide and oxygen substantially nil, carbon monoxide about 21.4%, hydrogen about 44.7%, methane about 1.8%, balance nitrogen; dew point $-2°$ F. A sample of the supplied city gas showed that it included a few per cent of carbon dioxide, about .5% oxygen, methane and illuminants considerably in excess of the methane. The reactions producing these product-gases were carried out at temperatures about 1950° F. On another date, with the gas-generator operating at the same temperature, a supply-mixture at a ratio of .65 to 1 produced substantially no carbon dioxide or oxygen, and less than 1% methane, when fed through the pipe 9. Upon reversal of the gas-flow and the mixture made leaner to a ratio 1 to 1, the carbon dioxide content was substantially nil for about two hours after which it slowly began to increase with a decrease in methane and an increase in water vapor content. The carbon dioxide content, even after such further operation of the gas-generator, comprised fractions of 1%. With the last-described operating conditions prevailing, it may be desirable to reverse the gas-flow and restore the richer mixture before carbon dioxide would be discharged with the product-gas. In atmosphere-heat-treating processes where a small amount of carbon dioxide can be tolerated, the reversal of gas-flow or application of the richer mixture could be delayed.

It will thus be observed that, by the simple expedient of measuring changes in the resistance to gas-flow through the pores or interstices of the catalyst, thus responding to slight differences in the amount of carbon-deposit, and regulating the richness of the gas-supply mixture, so as to be alternately slightly on the lean side and slightly on the rich side, it is not necessary to know the precise percentage of air (or other oxidizing gas) which is exactly necessary to oxidize, to carbon-monoxide, the carbon which is contained in the carbonaceous fuel-gas; and in fact this carbon-content may vary (as it normally will, in practice), either by reason of pressure-changes or composition-changes, from hour to hour, without deleteriously affecting our product.

It should be noted that several distinct gas-flow paths are provided in the embodiment of Fig. 1. A first path, for a supply of air, comprises the pipe 20, the mixing device 22, the pipe 23, the constant pressure device 24, the constant flow device 27 and the pipe 9. A second path, for a supply of additional air, comprises a part of the pipe 20, the valve 41 and pipe 40, a part of the pipe 23, the constant pressure device 24, the constant flow device 27 and the pipe 9. The third path, for a supply of fuel gas, comprises the pipe 21, the mixing device 22, the pipe 23, the constant pressure device 24, the constant flow device 27 and the pipe 9. Under the operating condition of the system in which the relatively richer mixture of air and fuel gas is supplied to the gas-generator, the first and third paths only are effective. For the other condition in which the relatively leaner mixture is supplied, all three paths are open. In Fig. 2, three paths, similar to those described in connection with Fig. 1 but including the valve 51, are provided for the leaner mixture, and two paths including the valve 53 for the richer mixture.

In both embodiments of our invention the relative proportions of the air and fuel gas supplied to the gas-generator are controlled in response to carbon conditions in the gas-reaction chamber as such carbon conditions, in the specific control devices shown, affects gas-flow conditions through the gas-generator; but while we have shown our invention in forms which now constitute preferred modes of application, it is obvious that other modes are possible and many embodiments following the teachings of our invention may be made.

We claim as our invention:

1. A system of a type described for producing a product-gas, comprising hydrogen and carbon-monoxide, comprising, in combination, gas-mixing means; air-supply pipe-means, and gas-supply pipe means for a fuel gas comprising a hydrocarbon, connected to said gas-mixing means; reaction-chamber means comprising a catalyst-containing reaction-chamber and heating means; connection pipe-means for conveying a flowing gas-mixture from said gas-mixing means to said reaction-chamber for reaction therein; gas-outlet means for product-gas from said reaction-chamber means; electrically operated controllable means for varying the relative amounts of the air and fuel gas supplied to said reaction-chamber means; responsive means automatically and differently responsive to different resistances to gas-flow caused by the deposition of carbon in said catalyst in said reaction-chamber means and consumption of carbon in said catalyst in said reaction-chamber means; and electric circuit means, automatically controlled by said responsive means, for controlling said controllable means, whereby the amounts of air and fuel gas are varied in predetermined manners respectively responsive to said deposition and consumption.

2. A system of a type described for reacting air and fuel gas comprising a hydrocarbon, to produce a special gaseous atmosphere comprising hydrogen and carbon monoxide, comprising, in combination, a gas-reaction means comprising a catalyst, and having gas-inlet means and gas-outlet means; a proportioning gas-mixing means; air-supply means and fuel-gas supply means for said gas-mixing means; connection means between said gas-mixing means and said gas-inlet means, whereby a gaseous fluid comprising a flowing mixture of air and fuel gas can be conveyed from said gas-mixing means to said gas-reaction means, said connection means comprising gas-flow regulating means for regulating the flow of said gaseous fluid to said gas-reaction means; operable pressure-responsive switch means comprising means, associated with said gas-reaction means, for operating said switch means responsive to gas-pressure conditions of said gas-reaction means; electromagnetic means associated with said supply means to vary the relative amounts of air and fuel gas supplied to the gas-reaction means operable for controlling the composition of said gaseous fluid supplied to said gas-reaction means; and circuit means between said switch means and electromagnetic means for causing operation of said electromagnetic means in response to operation of said pressure-responsive switch means.

3. The structure of claim 2 in which said pressure-responsive switch means comprises means responsive to the differential gas-pressure across said gas-reaction means.

4. The structure of claim 2 in which said pressure-responsive switch means comprises means responsive to a static gas-pressure in aid gas-reaction means.

5. A gas-generator comprising, in combination, gas-supply means for supplying a gas under pressure, said gas-supply means comprising an oxidizing-gas supply-means including an oxidizing-gas conduit for supplying an oxidizing gas, a fuel-gas supply-means including a fuel-gas conduit for supplying a carbonaceous fuel-gas, and means for varying the relative proportions of the oxidizing gas and the fuel-gas in a gaseous mixture of the two, a reaction-chamber having a porous catalytic filling, an inlet-conduit for supplying said mixture to said reaction-chamber, an outlet-conduit for said reaction-chamber, means for heating said reaction-chamber, a responsive means for variably responding to changes in the resistance to gas-flow through said reaction-chamber, and means, operated by said responsive means, for controlling the proportion-varying means of said mixture.

6. A system for producing a gaseous-atmosphere adapted for heat-treatment purposes, comprising, the combination with a gas-generator including a reaction-chamber in which an oxygen-containing gas and a carbonaceous fuel-gas can be reacted in different proportions, means for promoting the reaction of the gases comprising a porous catalytic filling in said reaction-chamber, and an outlet for product-gas; of a conduit system for selectively passing into said reaction-chamber different gas-supplies including a mixture of a first gas which is a carbonaceous fuel-gas and a second gas which is oxidizing in reaction with the first gas, said conduit system including a supply pipe for the first gas, a supply pipe for the second gas, regulating means for controlling the relative amounts of said first gas and said second gas that can be conveyed to said reaction-chamber, and a pump means for forcing the gas-supply through the reaction-chamber, said regulating means having a predetermined first operating-condition in which said reaction-chamber is provided with a relatively rich gas-supply for causing carbon to be deposited in said catalytic filling, and having a predetermined second operating-condition in which said reaction-chamber is provided with a lean gas-supply for consuming carbon deposited in said catalytic filling; a control means comprising a device movable to a first position by a predetermined change in the carbon deposit in said reaction-chamber as caused by the deposit of carbon in said catalytic filling when the gas supply to said reaction-chamber is relatively rich, and movable to a second position by a different predetermined change in the carbon deposit in said catalytic filling as caused by the consumption of carbon in the catalytic filling when the gas supply to said reaction-chamber is lean; and interconnecting operating means between said device and said regulating means for operating said regulating means to its second operating-condition when said device is moved to its first position, and for operating said regulating means to its first operating-condition when said device is moved to its second position.

7. A gas generator comprising, in combination, an air conduit and a fuel-gas conduit, said conduits communicating with a means for mixing the gases supplied thereto in any desired proportions, a conduit between said mixing means and a means for maintaining a constant rate of gas flow therethrough, a bypass conduit having a valve connecting the air conduit and the last named conduit, a first conduit connecting a chamber containing a porous catalytic filling with said constant flow means, a second conduit communicating with said chamber, means for heating said chamber, a pressure-responsive means having a conduit connection to the said first conduit, means operated by said pressure-responsive means when a predetermined pressure exists in the said first conduit arranged to operate the valve in the bypass conduit.

8. Apparatus for producing a special gaseous product by catalytic reaction of gases which comprises, in combination, a reaction chamber adapted to contain a catalyst and having an outlet for the gaseous product and an inlet for the admission of a gaseous mixture, a conduit extending from said inlet, said conduit including therein a flow regulator and a gas mixer, gas lines for supplying the component gases of the gas mixture to said conduit, regulating means associated with at least one of said gas lines operatively arranged to regulate the area of flow in said line, electromagnetic means for operating said regulating means, an electric circuit including said electromagnetic means and a switch, and pressure responsive means operatively connected to said chamber for operating said switch.

9. A method for continuously producing a product-gas having not over traces of carbon dioxide, utilizable as a special atmosphere in a heat-treating furnace, by the simultaneous reaction of air and a fuel gas comprising hydrogen and carbon, which method comprises alternately reacting the gases in a gas-pervious heated catalyst bed in different relative amounts for causing free carbon alternately to be seperated from the reacting gases and deposited in said catalyst bed, and to be consumed by the reacting gases, while producing said product-gas.

10. A method for continuously producing a product-gas, utilizable as a special atmosphere in a heat-treating furnace, by the reaction of air and a fuel gas comprising hydrogen and carbon, which method comprises passing the gases through a gas-pervious heated catalyst in relative amounts for producing said product-gas and for simultaneously causing free carbon to deposit in said catalyst; when flow of gas through said catalyst is sufficiently opposed by such deposited carbon, passing altered relative amounts of the gases through the catalyst for consuming deposited carbon; and when opposition to flow of gas through said catalyst is sufficiently reduced by the carbon consumption, restoring the first said relative amounts; whereby the different amounts are alternately passed through the catalyst.

11. The method of claim 10 characterized by the gases flowing in different directions respectively with increase and decrease in said carbon deposit.

CLARENCE E. PECK.
JOHN G. HOOP.

No references cited.